No. 762,783. PATENTED JUNE 14, 1904.
A. E. WATSON.
MOUNTING FOR ROTARY SCRAPERS ON AGRICULTURAL IMPLEMENTS.
APPLICATION FILED DEC. 2, 1903.
NO MODEL.

Witnesses
Walter C. Hart
William J. Harris

Inventor
Anthony Edwin Watson
by
Edw Walker & Sons
Attorneys

No. 762,783. Patented June 14, 1904.

UNITED STATES PATENT OFFICE.

ANTHONY EDWIN WATSON, OF KYNETON, VICTORIA, AUSTRALIA.

MOUNTING FOR ROTARY SCRAPERS ON AGRICULTURAL IMPLEMENTS

SPECIFICATION forming part of Letters Patent No. 762,783, dated June 14, 1904.

Application filed December 2, 1903. Serial No. 183,508. (No model.)

*To all whom it may concern:*

Be it known that I, ANTHONY EDWIN WATSON, farmer, a subject of the King of Great Britain, residing at Begg street, Kyneton, in the State of Victoria, Commonwealth of Australia, have invented certain new and useful Improvements in Mountings for Rotary Scrapers on Agricultural Implements, of which the following is a specification.

The object of this invention is to improve the mounting of rotary scrapers used for cleaning off the dirt or soil that collects on the wheels or disks of agricultural implements, and relates more particularly to an improvement on a previous invention forming the subject-matter of an application for patent in the United States, filed July 13, 1903, Serial No. 165,321.

Figure 1:
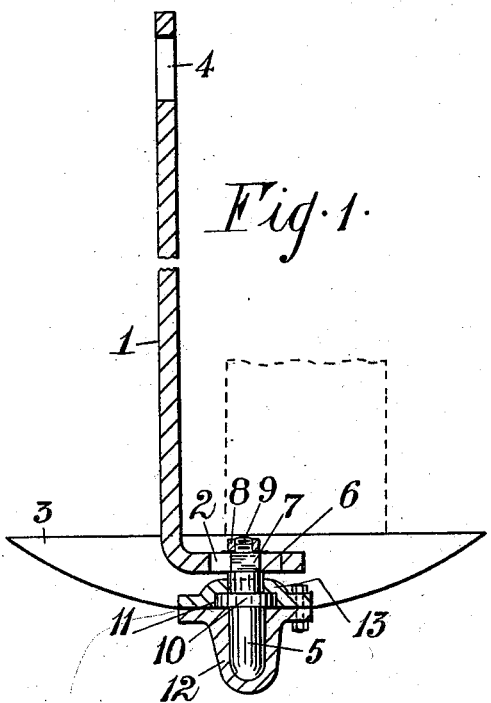
Figure 2:
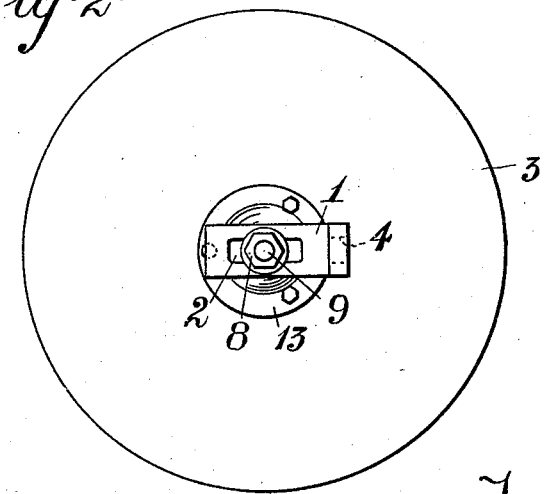

The drawings illustrating this invention comprise, in Figure 1, a horizontal section of the scraper and mounting with a portion of an implement-wheel shown in dotted lines, and in Fig. 2 a front elevation of same.

Referring now to the drawings, it will be seen that the mounting comprises a bracket 1, bent at right angles at the rear end, wherein is a slot 2 for the lateral adjustment of the concavo-convex disk 3, while at the forward end is another slot 4, through which the bracket is adjustably bolted to the frame of the implement. The disk is mounted at the rear of the bracket upon a spindle 5, which is provided with a shoulder 6 and a squared part 7, adapted to fit the slot 2, said spindle being clamped in position by screwing the nut 8 on the threaded end 9 thereof and jamming the bracket between it and the shoulder 6. The spindle is also provided with a collar 10, which fits a groove 11, formed in the boss of the disk, said boss being made in two parts 12 and 13, one thimble-shaped and constituting a bearing for the spindle, while the other part, 13, is recessed, as shown. When the two parts of the boss are bolted together through their flanges, with the disk between, the recessed part of the one, together with the face of the other, forms the groove 11, and thus maintains the scraper-disk on the end of the spindle free to rotate by the friction of the implement wheel or disk and cleans off the dirt and soil.

Having now particularly described and ascertained the nature of my said invention and in what manner the same is to be performed, I declare that what I claim is—

1. A mounting for rotary scrapers, comprising a bracket, a spindle provided with a collar intermediate of its ends one end of the spindle connected to the bracket and the other end projecting through the scraper with the collar bearing against the inner face thereof, a thimble-shaped socket secured to the scraper receiving the projecting portion of the spindle, and a bearing-plate secured to the scraper recessed to form a seat for the collar.

2. A mounting for rotary scrapers, comprising a bracket having one end bent at right angles to its length, a spindle having a collar intermediate of its ends, one end of the spindle adjustably connected to the bent portion of the bracket, the other end projecting through the scraper and its collar bearing against the inner face thereof, a thimble-shaped socket secured to the scraper and receiving the projecting portion of the spindle, and a bearing-plate secured to the scraper recessed to form a seat for the collar of the spindle.

3. A mounting for rotary scrapers, comprising a bracket having one end bent at right angles to its length, a spindle having a collar intermediate of its ends and being rounded at one end, the other end adjustably connected to the bent portion of the bracket, said spindle projecting through the scraper and its collar bearing against the inner face thereof, a thimble-shaped socket secured to the outer face of the scraper and receiving the rounded end portion of the spindle, and a bearing-plate secured to the scraper recessed to form a seat for the collar of the spindle.

In testimony whereof I have hereunto set my hand in presence of two subscribing witnesses.

ANTHONY EDWIN WATSON.

Witnesses:
    EDWARD WATERS,
    EDWARD WATERS, Junr.